April 15, 1958   J. GAULD   2,830,451
PROVING RING
Filed Dec. 6, 1956
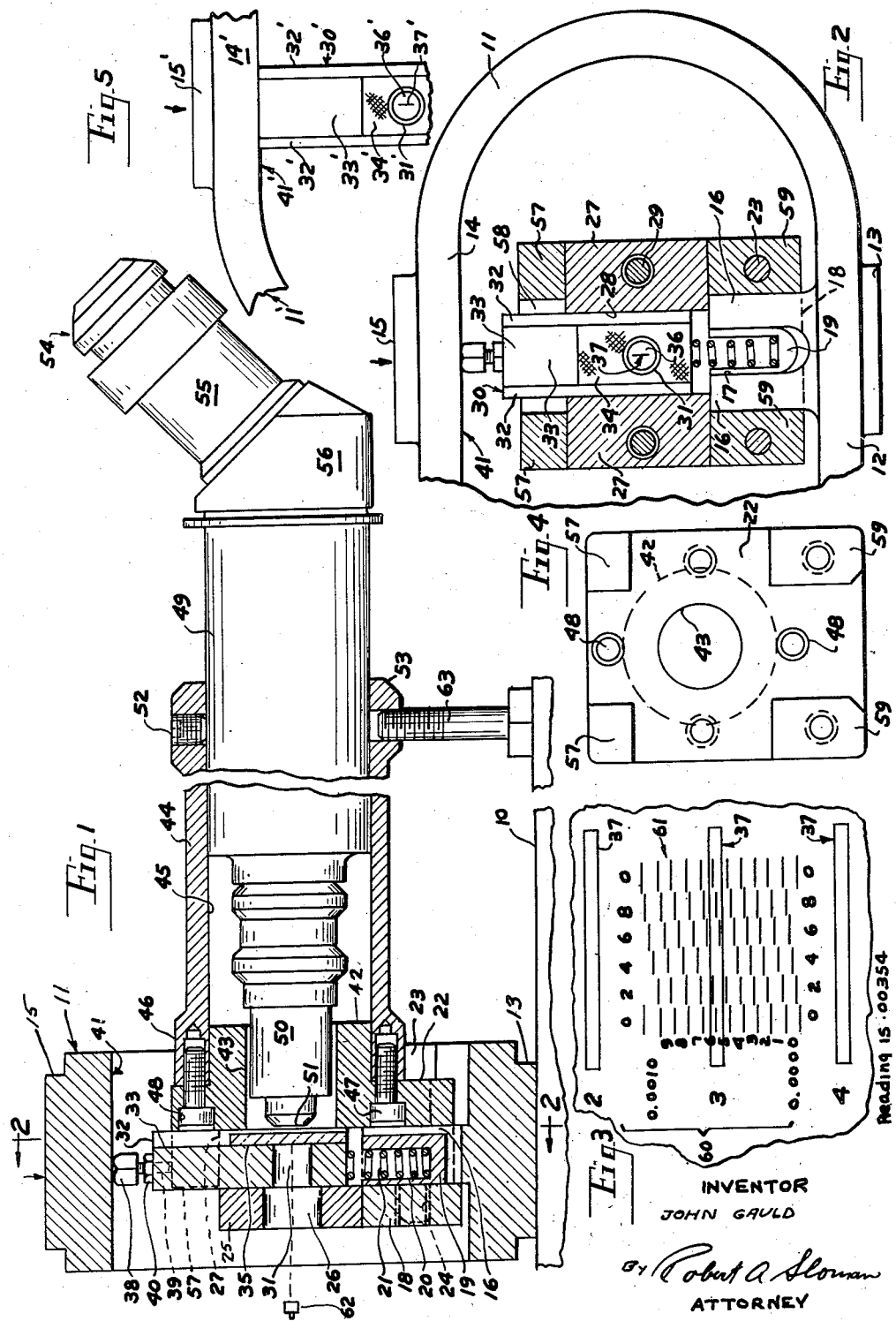
INVENTOR
JOHN GAULD
By Robert A. Sloman
ATTORNEY

United States Patent Office 2,830,451
Patented Apr. 15, 1958

2,830,451

PROVING RING

John Gauld, Detroit, Mich., assignor to Steel City Testings Machines, Inc., Detroit, Mich., a corporation of Michigan Application December 6, 1956, Serial No. 626,753

15 Claims. (Cl. 73—141)

This invention relates to a proving instrument or proving ring in the nature of an elastic metallic loop adapted for calibrating a testing or other machine, in which the measured deflection of a portion of the loop when loaded gives an accurate indication of the load applied thereto by such machine.

Heretofore various types of proving rings have been employed and wherein the extent of deflection under load was measured either by a vibrating reed in conjunction with a micrometer screw or by the use of a dial indicator.

There has long existed a need of providing a more accurate proving ring for use in conjunction with the calibration of machines such as the calibration of compression loads of various types of testing machines, including Brinell testing machines, Universal testing machines or in presses.

The ring or loop must be constructed to have the required degree of elasticity as to be deflected the same amount for any pre-determined compression or tensile load and on releasing of such load return to its initial undeflected condition.

Both of the above mentioned types of testing rings are graduated in increments of ten thousandths of an inch. It has been found that the degree of accuracy is not always the same with the vibrating reed type of measuring device due to human and mechanical factors, and inaccuracy also accompanies the use of dial indicators due to the use of gears.

It is therefore the object of the present invention to provide in a proving ring an optical device in combination therewith which will achieve a higher degree of accuracy in the measurement of deflection of the ring under load and wherein readings may be achieved to .00001 inch.

It is an object herein to provide in the present ring a slide carrying a target scale vertically movable with respect to a stationary visual reference means.

It is the further object of the present invention to incorporate within a proving ring structure a microscope in conjunction with a slide carrying a ruled scale and which responds vertically to the deflection of a portion of the ring under compression, and which target scale in conjunction with a microscope mounted on the stationary portion of the ring permits an accurate reading of the extent of such deflection or of the positions of the slide before and after deflection thus permitting accurate measurement of such deflection to one hundred thousandths of an inch.

It is the further object to provide in the microscope construction mounted upon the stationary portion of the proving ring a suitable eye piece with a vernier scale thereon and which will not only magnify the movable scale but will permit extremely accurate readings thereof.

These and other objects will be seen from the following specification and claims in conjunction with the appended drawing in which:

Figure 1 is an elevational section of the proving ring with the optical reading device mounted thereon.

Fig. 2 is a section taken on line 2—2 of Fig. 1, with the ring partly broken away.

Fig. 3 is a fragmentary elevational view showing the vernier scale of the eye piece superimposed over the vertically movable target scale.

Fig. 4 is a rear elevational view of the mounting plate.

Fig. 5 fragmentarily shows a slight variation of Fig. 2.

It will be understood that the above drawing illustrates merely one preferred embodiment of the invention in order to comply with the laws of the United States and that other embodiments are contemplated within the scope of the claims hereafter set forth.

The present proving ring includes a flexible metallic unitary ring body 11 of elliptical shape. Proving rings range in capacity between one thousand and three hundred thousand pounds. The present oval shape is often used for instruments having capacities up to thirty thousand pounds and for rings used in calibrating Brinell testers.

A round shape of ring body is employed for rings in excess of thirty thousand pounds. In either case the rings are forged from a special alloy steel and are carefully heat treated for uniform hardness in order to have the desired characteristics of flexibility.

On the ring body 11 there is a horizontally disposed bottom wall 12 and projecting therebelow the circular boss 13 whose under surface is perfectly flat for engagement with a supporting surface 10.

Ring 11 includes flattened top wall 14 and projecting upwardly therefrom and in alignment with boss 13 is the load receiving boss 15 whose top surface is adapted to receive a compression load which will cause downward deflection of wall 14 a predetermined amount dependent upon the load.

The present proving ring is particularly directed to the accurate measurement of such downward deflection. A ring of this type with slight changes can be used for measuring forces in tension and wherein the same optical measuring device herein can be employed.

Arranged upon bottom wall 12 upon the interior of said ring intermediate its front and rear, projecting upwardly as an integral part of the ring body is a pair of mounting bosses 16 in spaced-apart relation defining the slot 17, Fig. 2.

Transverse support plate 18 bears against the rear walls of bosses 16 and has a forwardly extending body 19 which snugly projects into the space 17. Body 19 has an upright bore 20 therein at its upper end loosely receiving coiled spring 21 whose upper end projects above said body.

Upright mounting plate 22 bears against the forward sides of mounting bosses 16 and is apertured to receive the rearwardly extending bolts 23 which are arranged laterally of bosses 16 and are tightly threaded as at 24 into plate 18. This provides a secure mounting for upright plate 22 by which the optical indicating and measuring device is mounted upon the proving ring body.

Above plate 18 I provide a guide block 25 with light aperture 26 and with the forwardly extending rectangular side walls 27 which engage the rear surface of mounting plate 22. These side walls 27, as shown in Fig. 2, define an upright guide slot 28 within which is slidably positioned the vertically movable target retainer slide 30 with transverse light aperture 31.

The mounting block 25 is snugly positioned between an upper pair of rearwardly extending spaced bosses 57 and a lower pair of rearwardly extending spaced bosses 59 which form a part of plate 22. These bosses prevent vertical movements of block 25 with respect to mounting plate 22. Said block is secured to plate 22 by the pair of bolts or screws 29 which extend through plate 22 and through portions of block 25 into which they are tightly threaded.

The vertically adjustable upright target retainer slide 30 is loosely positioned within block 25 to slidably engage the side walls 27. Said slide is resiliently mounted upon coiled spring 21. Slide 30 includes a pair of spaced forwardly extending side walls 32 whose forward edges loosely engage rear wall portions of mounting plate 22. These side walls define therebetween the depressed upright platform 33 upon which is mounted the rectangular strip of glass 34 suitably secured thereon by an adhesive along the surface 35 as shown in Fig. 1.

Target 36 in the form of a thin circular layer of a metallic substance is immovably positioned upon glass 34, and a suitable upright scale 37 is marked into the said target surface. In the present illustrative embodiment of the invention the target scale 37 is provided by ruling in the aluminum target 36 a series of vertically spaced horizontal lines, arranged .001 inch apart. A portion of the target scale is shown enlarged in Fig. 3, superimposed over the eye piece scale and vernier 60—61. One method of applying the target scale lines is with a conventional type of ruling engine. The lines of scale 37 are so formed as to remove portions of the metal backing of target 36 down to the glass 34 so as to permit the passage of light from a light source 62, Fig. 1, through apertures 26 and 31 and the glass target support 34 for viewing in the manner hereafter described.

Arranged above slide 30 is an adjustable contact screw 38 whose shank is threaded down thereinto at 39 and secured in position by lock nut 40. The head of the adjusting screw under the action of spring 21 engages the undersurface 41 of the horizontal top wall 14 of the ring body, as shown in Fig. 2.

Referring to Fig. 1, mounting plate 22 has on its front surface the forwardly extending annular flange 42 with bore 43 which extends through plate 22 for registry with target 36.

The elongated tube 44 with bore 45 is arranged at right angles to a plane passing through the vertical axis of the ring body and has an enlarged annular end 46 snugly positioned over flange 42 and up against plate 22. This tube is fixedly secured thereto by the pair of horizontally extending screws 47 whose heads are nested at 48 within the body of plate 22 as illustrated in Fig. 1. This provides a rigid mount for tube 44 within which is slidably and snugly projected the elongated horizontal tube 49 of a microscope.

The objective 50 of said microscope is loosely positioned within bore 43 of plate 22 so that the end portion of the objective lens 51 is in opposed spaced relation to the vertically movable target scale 37 on slide 30.

A series of set screws 52 extend radially inward through the enlarged flange 53 at the outer end of support tube 44 for fixedly engaging microscope tube 49. The microscope includes the eye piece assembly 54 on the tubular portion 55 whose axis is preferably arranged at a 45 degree angle to the axis of tube 49 and connected therewith by the coupling 56. The provision of the angular eye piece is to facilitate viewing through said eye piece when the proving ring is arranged for use upon a suitable support 10 in the position shown in Fig. 1.

In the preferred embodiment shown for illustration only, the microscope provides a 500 magnification to thereby produce optically extremely accurate direct readings of the position of the target scale 37, Fig. 3, with respect to the superimposed image of the vernier scale 60—61 within the eye piece assembly 54.

In the slide assembly, mounting block 25 is retained against vertical movement by the pairs of rearwardly extending lugs 57 and 59 forming a part of plate 22. Accordingly the support for the target slide is immovable with respect to plate 22 which carries the microscope assembly. The upper lugs 57 are spaced outwardly of slide 30 as indicated at 58 in Fig. 2 and do not interfere with movements of the target scale carrying slide.

One of the factors which limits the accuracy of proving rings employing a dial indicator or a vibrating reed and micrometer screw is that the graduations are in increments of .0001 inch. Any additional figure to the hundred thousandths place is only an estimate based upon the user's judgment. Furthermore only an indirect reading is obtained.

In the present proving instrument there is provided a vernier scale 61 in conjunction with the eye piece scale 60. The scale markings 60 are arranged a distance between zero and .0010 inch. Vernier 61 consists of a series of staggered columns which will measure accurately .00002 inch. When the proving ring is under a compression load target 36 will have moved downwardly from an initial position.

As the microscope reverses the direction of movement the enlarged scale 37 fragmentarily shown in Fig. 3 including the large numbers 2, 3 and 4 will have actually moved upwardly with respect to the scales 60 and 61. For illustration, target scale 37 may have 100 lines .001 inch apart only three of which show in Fig. 3, such as would be viewed through eye piece 54.

Making a direct reading of the position of the target scale is in effect determining the location of the central target line 37 with respect to zero on scale 60. With the help of vernier 61 the exact location of the central target line 37 with respect to scale 60 is .00354 inch, for illustration, because line 37 is bracketed by the two lines in the number 4 vernier column.

In the present microscope there is employed for illustration a 40 power objective lens and with the eye piece 54 having a 12½ power. This produces a 500 magnification. It is contemplated however that the objective lens might be reduced to a 20 power but that the magnification maintained if desired by increasing the power of the eye piece. Reduction of the magnification of the objective lens to 20 power for example gives greater depth of focus and facilities making the readings.

In operation there is provided optically a means of effecting a direct reading of the extent of deflection of the ring body under load by ascertaining the location of the target scale 37 with respect to the stationary reference eye piece scales 60 and 61.

The extent of movement is determined by subtracting an initial undeflected reading and the reading of the target after deflection. This will give the exact distance directly of longitudinal movements of the target scale with an accuracy in the hundred thousands of an inch and with no estimating.

In the use of a calibrated proving instrument, the measured deflection under a load by reference to the calibration table for the particular instrument will give the amount of load applied by the testing or other equipment being calibrated.

For example, set out below are illustrative deflection readings for a particular calibrated proving instrument and the loads corresponding thereto.

| Deflection reading in inches: | Load in pounds |
| --- | --- |
| .02112 | 4400 |
| .02208 | 4600 |
| .02496 | 5200 |
| .02976 | 6200 |
| .03168 | 6600 |
| .03367 | 7000 |
| .03856 | 8000 |
| .04356 | 9000 |
| .04830 | 10000 |

In calibrating a testing machine, for example, using the above particular proving ring the operator will know that if the deflection is .04356 inch the machine is exerting a force of 9000 pounds, and with a deflection of .04830 inch, 10,000 pounds.

The present proving instrument may also be used for accurately calibrating new proving rings. This would obviate the sending of the new proving ring to the United States Bureau of Standards for calibrating.

If desired a small adjustable standard may be employed to stabilize or support the forward end of the microscope mounting tube. For such purpose there is provided as one form of support the adjustable bolt 63 depending from tube flange 53 with its head engageable with the support surface 10.

Slide support 30 is spring biased upwardly to engage the undersurface 41 of the top wall 14 of ring 11 so as to follow the flexing movements thereof under a compression or tension load, what is important however, is that the target carrying member 30 moves with the flexed wall of the ring.

In Fig. 5 the same thing is accomplished by depending the target holder 30', from the under surface 41' of the top wall 14' of proving ring body 11 fragmentarily shown.

Elements in Fig. 5 corresponding to Fig. 2 are primed, and their description is not repeated. The only difference is that spring 21 and the guide block 25 are no longer required. Nevertheless the same result is obtained.

Having described my invention, reference should now be had to the claims which follow. I claim:

1. A proving instrument comprising an upright flexible metallic loop having a bottom wall mountable upon a supporting surface and a diametrically opposed load receiving top wall, guide means within said loop fixedly mounted upon said bottom wall, a vertically movable target retainer slide positioned within said guide means, resilient means interposed between said guide means and slide normally urging said slide into contact with the undersurface of said top wall, whereby deflection thereof under a compressive load will effect a vertical movement of said slide against the action of said resilient means, an upright target scale on said slide, and visual reference means mounted upon said bottom wall with respect to which said target scale is movable.

2. A proving instrument comprising an upright flexible metallic loop having a bottom wall mountable upon a supporting surface and a diametrically opposed compressive or tensile load receiving top wall, guide means within said loop fixedly mounted upon said bottom wall, a vertically movable target retainer slide positioned within said guide means, resilient means interposed between said guide means and slide normally urging said slide into contact with the under surface of said top wall, whereby deflections thereof under such loads will effect a corresponding vertical movement of said slide, an upright target scale on said slide, and visual reference means mounted upon said bottom wall with respect to which said target scale is movable.

3. The proving instrument of claim 1, and a boss depending from said bottom wall having a flattened bottom engageable with said supporting surface.

4. The proving instrument of claim 1, a boss depending from said bottom wall having a flattened bottom engageable with said supporting surface, and a load receiving boss vertically aligned with said first boss and extending above said top wall.

5. The instrument of claim 1, said visual reference means being an optical instrument for magnifying and visibly determining the vertical movement of said target scale.

6. The proving instrument of claim 1, and an adjustable contact screw at the upper end of said slide engaging said undersurface.

7. The proving instrument of claim 1, said visual reference means being a microscope for magnifying said target scale and including a stationary eye piece reference scale with venier optically superimposed upon the magnified image of said target scale for accurately determining the vertical movement of said target scale.

8. The proving instrument of claim 1, said visual reference means including an optical magnifier longitudinally aligned with said target scale and including a stationary reference scale relative to which the magnified image of said target scale is optically superimposed.

9. The proving instrument of claim 1, the mounting for said guide means including an upright boss integral with said bottom wall and projecting upwardly therefrom, a support plate bearing against one side of said boss, and an upright mounting plate for said visual reference means and for said guide means bearing upon the opposite side of said boss and fixedly secured to said support plate tightly and retainingly engaging said boss therebetween.

10. The proving instrument of claim 1, the mounting for said guide means including an upright boss integral with said bottom wall and projecting upwardly therefrom, a support plate bearing against one side of said boss, and an upright mounting plate for said visual reference means and for said guide means bearing upon the opposite side of said boss and fixedly secured to said support plate tightly and retainingly engaging said boss therebetween, said guide means including a vertically slotted block retained against vertical movement with respect to said mounting plate and fixedly secured thereto.

11. A proving instrument comprising an upright flexible metallic loop having a bottom wall mountable upon a supporting surface and a diametrically opposed load receiving wall, a pair of spaced bosses integral with said bottom wall and extending upwardly therefrom, said bosses defining a slot therebetween, a support plate bearing against one side of said bosses and including a forwardly extending body projected snugly into the slot defined by said bosses and having an upright bore at its upper end, an upright apertured mounting plate bearing against the other side of said bosses, secured to said support plate tightly and retainingly engaging said bosses, a vertically slotted transversely apertured guide block above said support plate extending forwardly to said mounting plate retained against vertical movement by said mounting plate, and tightly secured thereto, an apertured vertically movable target retainer slide guidably positioned within said block loosely engaging said mounting plate, a spring nested in said bore extending thereabove supportably engaging said slide, a contact screw at the upper end of said slide engaging the under surface of said top wall, whereby deflection thereof under compressive or tensile loads will effect a vertical movement of said slide, an upright target scale on said slide, and visual reference means on said mounting plate extending laterally thereof and in horizontal registry with said target scale, the apertures in said mounting plate, guide block, and target retainer slide permitting the passage of light to said target scale and to said visual reference means.

12. The proving instrument of claim 1, an upright boss on said bottom wall, an apertured upright mounting plate fixedly secured to said boss and supporting said guide means, apertured support means on said mounting plate, a horizontally disposed tube tightly secured at one end to said support means, said visual reference means including a microscope snugly projected into said tube with its objective within said support means in opposed spaced relation to said target scale, the apertures in said mounting plate and support means permitting the passage of light to said target scale and to said microscope.

13. The proving instrument of claim 1, an upright boss on said bottom wall, an apertured upright mounting plate fixedly secured to said boss and supporting said guide means, apertured support means on said mounting plate, a horizontally disposed tube tightly secured at one end to said support means, said visual reference means including a microscope snugly projected into said tube with its objective within said support means in opposed spaced relation to said target scale, said guide means and slide being apertured, said target scale consisting of a transparent support carrying an opaque target layer having a series of parallel scale lines cut therein down to the transparent support, and a light source spaced from the side of said instrument opposite from the microscope for transmitting light rays through the aperture in said guide means, slide and scale support to said microscope.

14. A proving instrument comprising an upright flexible metallic loop having a bottom wall mountable upon a supporting surface and a diametrically opposed load receiving top wall, guide means within said loop fixedly mounted upon said bottom wall, a vertically movable target retainer slide positioned within said guide means, resilient means interposed between said guide means and slide normally urging said slide into contact with the undersurface of said top wall, whereby deflection thereof under a tensile load will effect a vertical movement of said slide under the action of said resilient means, an upright target scale on said slide, and visual reference means mounted upon said bottom wall with respect to which said target scale is movable.

15. A proving instrument comprising an upright flexible metallic loop having a bottom wall mountable upon a supporting surface and a diametrically opposed compressive or tensile load receiving top wall, an upright vertically movable target retainer joined to and depending from the undersurface of said top wall, whereby deflections thereof under such loads will effect a corresponding vertical movement of said retainer, an upright target scale on said retainer, an upright boss on said bottom wall, an apertured upright mounting plate fixedly secured against one side of said boss, an apertured support plate bearing against the opposite side of said boss and fixedly secured to said mounting plate tightly and retainingly engaging said boss therebetween, a horizontally disposed tube tightly secured at one end to said mounting plate, and a microscope snugly projected into said tube with its objective within said mounting plate in opposed spaced relation to said target scale, the apertures in said mounting plate and support plate permitting the passage of light to said target scale and to said microscope.

References Cited in the file of this patent
UNITED STATES PATENTS

| | | |
|---|---|---|
| 1,724,993 | Coker | Aug. 20, 1929 |
| 1,927,478 | Whittemore | Sept. 19, 1933 |
| 2,571,839 | Conover | Oct. 16, 1951 |
| 2,637,198 | Spangler | May 5, 1953 |
| 2,659,233 | Flagg | Nov. 17, 1953 |